Patented Mar. 25, 1952

2,590,825

UNITED STATES PATENT OFFICE 2,590,825

PROCESS OF PREPARING ANTHRIMIDES

Mario Scalera, Somerville, and Hugh W. Stewart, Plainfield, N. J., assignors to American Cyanamid Company, New York, N. Y., a corporation of Maine No Drawing. Application July 7, 1950, Serial No. 172,622

13 Claims. (Cl. 260—367)

This invention relates to the manufacture of alpha,beta anthrimides from alpha halogen anthraquinone and beta aminoanthraquinone compounds having the following formulae:

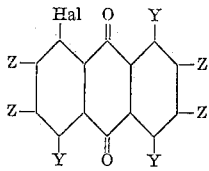 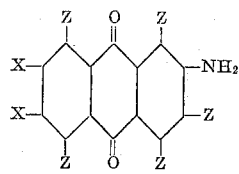

in which Hal represents a halogen, such as chlorine, bromine and iodine, Z represents monovalent inert substituent selected from the class consisting of hydrogen and an unreactive substituent group, such as acylamino, alkyl and alkoxy groups, one Y is selected from the group consisting of Hal and Z, and the other Y's are Z, and one X is Z and the other X is selected from the group consisting of $NH_2$ and Z, and it comprises new and improved methods for producing alpha, beta anthrimides wherein said alpha-halogen anthraquinone and said beta amino compounds are reacted together in an organic solvent in the presence of an acid binding agent sufficient to react with the hydrogen halide set free and in the presence of a cupriferous catalyst containing copper and iodine in the ratio of from 0.9 to 2.0 atoms of iodine per atom of copper.

Anthrimides have been produced in the past by the well-known Ullmann reaction in which a halogen anthraquinone is reacted with an aminoanthraquinone, usually in an inert organic solvent and in the presence of an acid binding agent. Cupriferous catalysts are normally used, the common one being cupric chloride, although there have been suggested the use of other copper halogen compounds such as cuprous iodide. In the past in Ullmann reactions these two types of catalysts have been substantial equivalents.

The Ullmann reaction has been used extensively for the preparation of alpha-alpha-anthrimides by the reaction of alpha-amino and alpha-halogen anthraquinones. In many cases the yields are nearly quantitative and the various cupriferous catalysts are equivalent. Alpha,beta-anthrimides, however, have presented a serious problem. In the past the only practical method involved the reaction of an alpha-aminoanthraquinone with a beta-chloroanthraquinone. The above restriction has been a very serious drawback, particularly when it is desired to produce substituted alpha,beta-anthrimides. In many cases it is more convenient to prepare beta-amino and alpha-halogeno intermediates, rather than vice versa. Thus, for example, when preparing alpha,beta-trianthrimides of the formula:

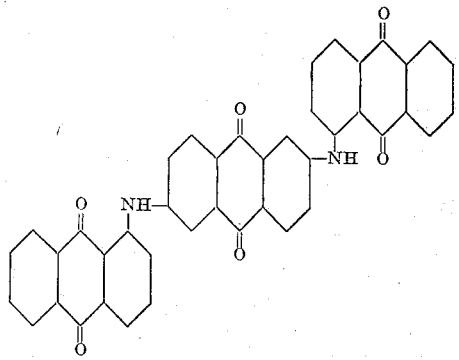

it would be much more economical to use 2,6-diaminoanthraquinone than to use the 2,6-dichlor or dibromo derivatives which are much more difficult to prepare.

By the present invention, alpha,beta anthrimides can be readily prepared from alpha halogen anthraquinones and beta-aminoanthraquinones by reacting the same together in the presence of a cupriferous catalyst containing copper and iodine in the ratio of 0.9 to 2.0 atoms of iodine per atom of copper. In other words, we have found that said cupriferous catalysts are very effective condensing agents in this particular reaction and so facilitate the reaction as to produce high yields of alpha,beta-anthrimides substantially free of impurities as fully set forth post. The discovery represents an important advance in the commercial art and was described in our prior co-pending application Serial No. 618,583, filed September 25, 1945, now abandoned, the present application being a continuation-in-part thereof.

According to the present invention, alpha,beta-anthrimides are obtained by reacting an alpha-halogenoanthraquinone of the formula:

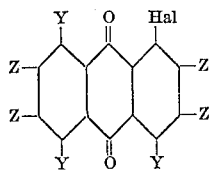

where Hal stands for chlorine, bromine and iodine, one Y is selected from the group consisting of Hal and Z, and Z is selected from the group consisting of hydrogen and a substituent unreactive under Ullmann conditions, with a beta-aminoanthraquinone of the formula:

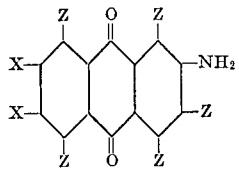

in which one X is selected from the group consisting of amino and Z, the other X is Z, and Z is selected from the above-given group. Among the unreactive groups are such groups as acylamino, alkyl and alkoxy. On the other hand, reactive groups such as halogen, amino and nitro groups are not included under the substituents designated by Z.

The process of the present invention is effected in the presence of the customary acid binding agent but the catalyst must be one containing copper and iodine in the proportions of from slightly less than one, i. e. about 0.9, to two mols of iodine per mol of copper. In other words, the iodine content ranges from slightly less than that corresponding to cuprous iodide up to that corresponding to cupric iodide. The use of the term "slightly less than one mol" as applied to iodine will be used throughout the following specification and claims to mean amounts not materially less than 0.9 mol. The efficiency of the process drops off as the upper limit of two mols of iodine is approached, larger amounts of iodine appear in part as free iodine and cause an even more marked falling off in yield. In general the range from slightly less than a mol to about a mol and a quarter represents the optimum range though this will vary somewhat with different reactants.

The reaction of the present invention does not follow standard Ullmann reaction experience. The ordinary commercial Ullmann catalysts, such as cupric chloride, give such low yields as to be quite useless, and cuprous chloride gives results that are only slightly, if any, better. On the other hand, the copper-iodine catalysts of the present invention give excellent yields, and in the present reaction are in no sense the equivalents of chlorides of copper. The copper and iodine ratios have been referred to in connection with known compounds. However, it is in no sense necessary to add the copper and iodine as a preformed salt such as cuprous iodide. On the contrary, the proper proportions of copper and iodine added separately give substantially identical results. It is quite probable that there are formed several copper-iodine compounds, and it may be that a good proportion of the activity of the catalyst is due to the formation of small amounts of unstable cupric iodide. This hypothesis is supported by the fact that free iodine is not observed in the reaction mixture when less than two atoms of iodine are present per atom of copper. On the other hand, when most of the iodine is present as cupric iodide optimum results are usually not obtained, and it is possible that under such conditions a more stable form of cupric iodide results. The above hypotheses are advanced only as possible explanations of the surprisingly different behavior of copper-iodine compounds in the reaction of the present invention. It is not intended to limit the present invention to the above or any other theory of action and the strikingly improved results over the standard copper chloride Ullmann catalysts may be due to other factors not fully known at present. It is also not known why the copper-iodine catalysts do not show improved results in the other Ullmann reactions when compared to cupric chloride. Apparently the copper-iodine catalyst acts in a different manner with beta-amino groups than with alpha-amino groups. Just what the nature of this different reaction may be is not known.

It is an advantage of the present invention that the amount of catalyst is not critical. We have found that minute amounts of catalyst are ineffective. In general, about 0.1 mol of copper per mol of beta-aminoanthraquinone represents the lower limit of practical operation. It may well be that the catalyst actually enters into the reaction and is continuously regenerated, so that it is more in the nature of a condensing agent than a pure catalyst. The two terms are therefore used in the present case in their more general equivalent sense. Excessive amounts of catalyst merely waste copper and iodine and, in general, the optimum results are obtained in the range of 0.1–1.0 mol copper per mol of beta-aminoanthraquinone. In its more specific aspects the present invention includes this range of condensing agent.

It is an additional advantage of the present invention that there are no critical solvents. The usual inert solvents which are employed in other Ullmann reactions are useful. They should, of course, be inert to the conditions of the reaction at the elevated temperatures in the range of 150–250° which are often attained. Nitrobenzene, which is feasible and satisfactory, is considered the preferred solvent. It is also possible to operate without any solvent, but ease of mechanical manipulation makes solvent or diluent desirable. The process of the present invention operates effectively with any beta-aminoanthraquinone free from reactive substituents. Suitable reactants include 2-aminoanthraquinone, 2-amino-5-benzoylaminoanthraquinone, 2,6-diaminoanthraquinone, 3 - methyl-2-aminoanthraquinone, 2,7-diaminoanthraquinone, and 3-methoxy-2-aminoanthraquinone.

The halogen derivative may be any alpha-halogenoanthraquinone free of other substituents which are reactive under Ullmann reaction conditions. Examples are: alpha-chloranthraquinone, 1-chloro-5-benzoylaminoanthraquinone, 1 - chloro - 4 - benzoylaminoanthraquinone, 1 - chloro - 4 - methylanthraquinone, 1 - chloro-5-acetylaminoanthraquinone, 1-chloro-4-methoxyanthraquinone, 1,5 and 1,8-dichloroanthraquinone, 1-bromoanthraquinone, 1,5 and 1,8-dibromoanthraquinone, 1-iodoanthraquinone, 1-bromo - 2 - methoxyanthraquinone, 1-bromo-4-methoxyanthraquinone, and 1-chloro-8-methoxyanthraquinone. As in the case of the aminoanthraquinone reactant, nitro groups are not desirable because they are not inert under the conditions of the reaction.

The invention will be described in greater detail in the following specific examples, the parts being by weight.

Example 1

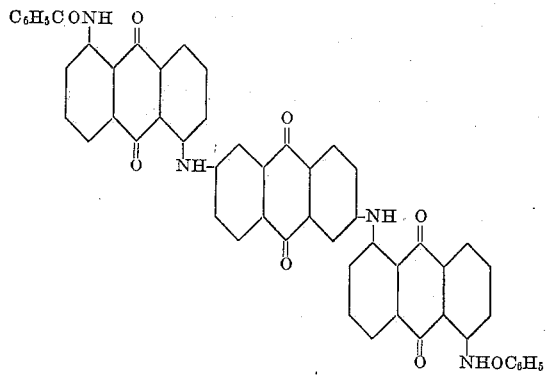

Into 1,520 parts of nitrobenzene are slurried the following chemicals: 152 parts of 1-chloro-5-benzoylaminoanthraquinone, 47.6 parts of 2,6-diaminoanthraquinone, 85 parts of soda ash, 10.2 parts of copper powder and 25.4 parts of iodine. The resulting slurry is heated with stirring at the refluxing temperature, 210° C., for 24 hours. After cooling, the product is filtered, washed with nitrobenzene, alcohol and water, and dried.

There are obtained 156 parts of a bright red-brown product, corresponding to a yield of 88% of the theoretical.

The product dissolves in concentrated sulfuric acid with a bright green color, and is precipitated by dilution as red-brown flocs. It dyes cotton from the vat a bright red-brown shade.

The same results are obtained if the copper powder and iodine are replaced by 30.6 parts of cuprous iodide and 5.0 parts of iodine.

The effect of varying proportion of iodine in the cupriferous catalyst is illustrated in the table below:

| Expt. No. | Mols of Copper per Mol of 2,6-Diaminoanthraquinone | Atoms of Iodine per Mol of 2,6-Diaminoanthraquinone | Per Cent Yield |
|---|---|---|---|
| 1 | 0.8 | 0.0 | [1] 53 |
| 2 | 0.8 | 0.4 | [2] 74 |
| 3 | 0.8 | 0.6 | [2] 74 |
| 4 | 0.8 | 0.8 | 82 |
| 5 | 0.8 | 0.9 | 90 |
| 6 | 0.8 | 1.0 | 90 |
| 7 | 0.8 | 1.1 | 87 |
| 8 | 0.8 | 1.2 | 86 |
| 9 | 0.8 | 1.4 | 87 |
| 10 | 0.8 | 1.6 | 84 |
| 11 | 0.8 | 2.2 | 75 |

[1] Very impure.
[2] Impure.

If cuprous chloride is used in place of copper and iodine in the above reaction, the crude yield is 45%, and the product is largely unchanged 2,6-diaminoanthraquinone. If cupric chloride is employed in the place of the copper and iodine, a 50% yield of a very impure product results.

Example 2

152 parts of 1-chloro-5-benzoylaminoanthraquinone, 47.6 parts of 2,6-diaminoanthraquinone, 66 parts of anhydrous sodium acetate, 10.2 parts of copper powder, and 25.4 parts of iodine are suspended in 3,000 parts of nitrobenzene. The slurry is heated to the boil (210° C.) and held at this temperature under reflux for 24 hours.

After cooling, the product is isolated by filtration, and washed with nitrobenzene and alcohol. It is then treated with steam to remove all nitrobenzene, filtered, washed with water and dried.

The yield is 128 parts, or 72% of the theoretical. The product is identical with that described in Example 1.

Example 3

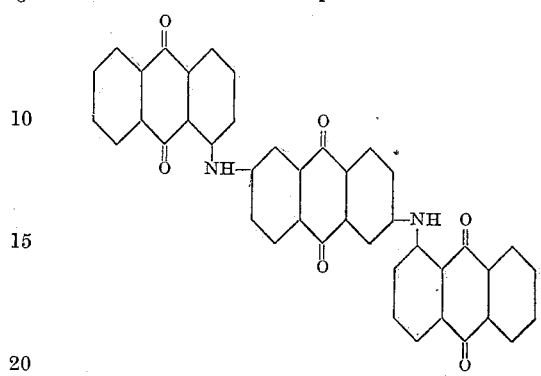

23.8 parts of 2,6-diaminoanthraquinone, 52 parts of 1-chloroanthraquinone, 50 parts of anhydrous sodium carbonate, 51 parts of copper powder, 12.7 parts of iodine and 900 parts of nitrobenzene are heated at the reflux temperature (210° C.) for about 24 hours. The red-brown slurry is filtered when cool, and the filter cake is washed with nitrobenzene and alcohol. The cake is finally steamed free of traces of nitrobenzene, from an acid slurry.

The product is obtained in quantitative yields by filtering, washing and drying.

The dye is red-brown in color, is bright green in concentrated sulfuric acid, and dyes cotton a reddish brown shade from a red-brown vat.

A much lower yield of inferior quality product is obtained if cupric chloride is used as the catalyst instead of the copper and iodine as above described.

Example 4

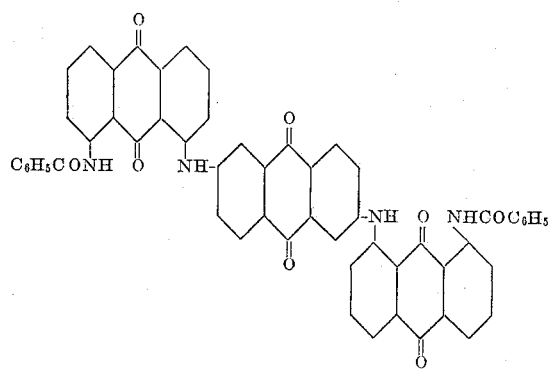

304 parts of 1-chloro-8-benzoylaminoanthraquinone, 95.2 parts of 2,6-diaminoanthraquinone, 170 parts of soda ash, 20.4 parts of copper powder, and 50.8 parts of iodine are introduced into 3,600 parts of nitrobenzene. The slurry is heated with stirring to the boiling temperature, and maintained under reflux at that temperature for 24 hours.

After cooling, the product is isolated by filtration and washed with nitrobenzene. The press cake is steam stripped free of nitrobenzene, filtered, washed and dried.

There are obtained 284 parts of product or a yield of 80% of the theoretical. The product dissolves in concentrated sulfuric acid with a green color, and dyes cotton a bright red-brown shade, considerably bluer than the product of Example 1.

If in the above example 1-chloro-4-benzoylaminoanthraquinone is used in place of the 1- chloro-8-benzoylaminoanthraquinone, there is obtained a dark product, the 4,4''-dibenzoylamino-1,2'-6',1''-trianthrimide. This product dissolves in concentrated sulfuric acid with a green color, and dyes cotton from the vat a bluish brown, very level shade, which shows very good properties of fastness.

In both of the above reactions, inferior results are obtained when cupric chloride is used as the catalyst.

*Example 5*

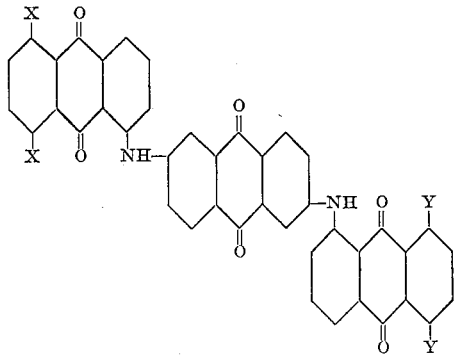

where one X and one Y stand for C₆H₅CONH—, the other X and the other Y being hydrogen.

304 parts of a technical mixture of 1,5- and 1,8-chlorobenzoylaminoanthraquinone (obtainable by the successive chlorination, reduction and benzoylation of the nitration product of anthraquinone-1-sulfonic acid) are slurried in 3,600 parts of nitrobenzene. To this slurry are added 95.2 parts of 2,6-diamino anthraquinone, 200 parts of iodine. The slurry is heated to the boiling point with agitation, and kept at the boiling temperature for 24 hours under reflux.

After cooling, the mass is filtered, washed with nitrobenzene, and the cake is freed from nitrobenzene by steam. The product is filtered and dried.

The yield is 314 parts, or 88.5% of the theoretical, of a bright red-brown product. The product may be purified further, if desired, by dissolving it in 20 parts of concentrated sulfuric acid, diluting the solution to 20% acid strength, and oxidizing the resulting red-brown slurry with sodium dichromate. The product thus obtained dyes cotton from the vat a rich red-brown shade of outstanding fastness properties.

The yield of product obtained in this reaction, shows a dependence on the iodine-to-copper ratio similar to that described in Example 1. The use of cupric chloride, instead, gives much inferior results.

*Example 6*

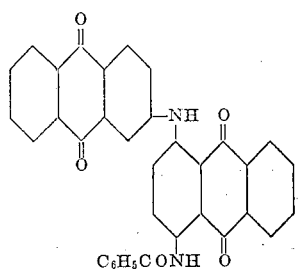

55.6 parts of 2-aminoanthraquinone, 90.5 parts of 1-chloro-4-benzoylaminoanthraquinone, 53 parts of soda ash, 16 parts of iodine, 6.4 parts of copper powder, and 1,600 parts of nitrobenzene are mixed and heated with stirring to the refluxing temperatures. This temperature is maintained under reflux for 24 hours.

After cooling, the product is isolated by filtration, washed with nitrobenzene and steam distilled free of solvent.

The yield of dry product is 96 parts, or 71% of the theoretical. It dyes cotton from the vat a Corinth shade.

Inferior results, with respect to both yield and purity, are given when cupric chloride is used as a catalyst.

*Example 7*

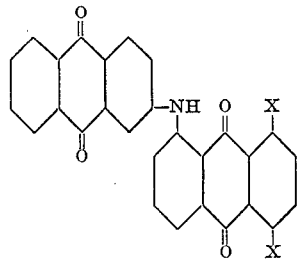

where one X is C₆H₅CONH— and the other X is hydrogen.

362 parts of a technical mixture of 1,5- and 1,8-chlorobenzoylaminoanthraquinone (prepared, for instance, as described in the first paragraph of Example 5) are slurried in 6,000 parts of nitrobenzene. To this slurry are added 223 parts of 2-aminoanthraquinone, 212 parts of soda ash, 25.6 parts of copper powder, and 64 parts of iodine.

The slurry is heated with agitation to the boiling temperature, and held at this temperature for 24 hours. It is filtered after cooling. The brown product is washed with nitrobenzene, then with alcohol, and finally freed of all traces of solvent by means of steam, and dried.

The yield is 387 parts, or 71% of the theoretical. The product dyes cotton a brown shade of good fastness from a hydrosulfite bath.

If, in the above experiment, one-half the quantity of iodine is used (32 parts), all other usages remaining the same, the yield of product obtained is only 207 parts, or 39% of the theoretical.

*Example 8*

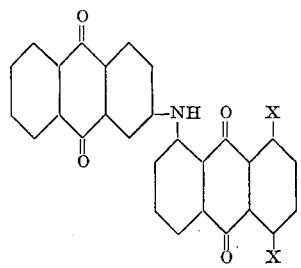

where one X represents C₆H₅CONH— and the other represents H.

To 360 parts of nitrobenzene are added 17.8 parts of 2-aminoanthraquinone, 20 parts of sodium carbonate, 2.0 parts of copper, 5.1 parts of iodine, and 30.4 parts of a mixture of 1-chloro-5-benzoylamino and 1-chloro-8-benzoylaminoanthraquinone. The resulting slurry is refluxed 24 hours, cooled, filtered, and washed with 480 parts of nitrobenzene. The product is steam distilled free of nitrobenzene, slurried in alcohol, filtered, washed, and dried. The yield of red-brown anthrimide is 33.0 parts, or over 75% of the theoretical.

If the copper and iodine in the above reaction are replaced by 4.1 parts of anhydrous cupric chloride, the yield of product is only about 20%, and the product is much inferior in quality.

*Example 9*

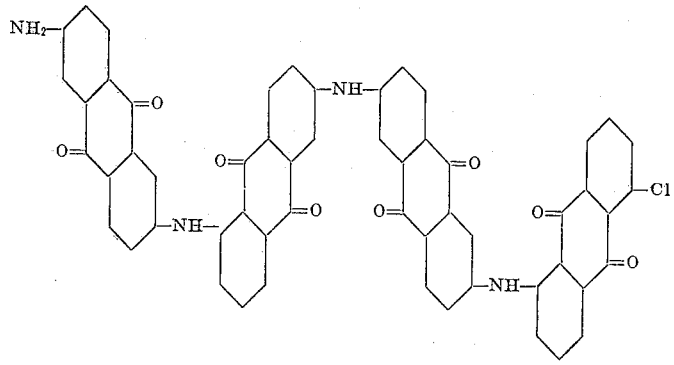

A mixture of 19.1 parts of 2,6-diaminoanthraquinone, 23.3 parts of 1,5-dichloroanthraquinone, 360 parts of nitrobenzene, 40 parts of anhydrous sodium carbonate, 4.1 parts of copper powder, and 10.2 parts of iodine, is refluxed for 24 hours, cooled and filtered. The cake is washed with 480 parts of nitrobenzene, then steam stripped free of solvent, slurried in alcohol, and filtered, washed and dried. The product is further purified by acid pasting from 18 times its weight of concentrated sulfuric acid, followed by heating in ammonium hydroxide solution, filtering, and washing. 37.9 parts of tetranthrimide are obtained, representing a quantitative yield of 102%, the tetranthrimide containing a small amount of anthramides of other molecular weights. It is a brown product which dyes cotton in reddish-brown shades.

When the amount of iodine is reduced to 8.1 parts, the yield obtained is 98%. Replacing the copper-iodine catalyst with 8.2 parts of anhydrous cupric chloride reduces the yield to about 57%, and the product gives weak tan dyeings.

*Example 10*

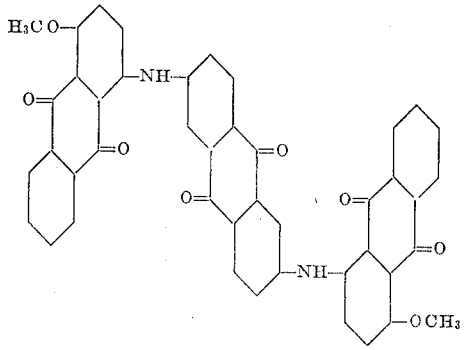

A mixture of 95.5 parts of 2,6-diaminoanthraquinone, 228 parts of 1-chloro-4-methoxyanthraquinone, 1800 parts of nitrobenzene, 200 parts of sodium carbonate, 20.5 parts of powdered copper, and 50.8 parts of iodine, is refluxed for 24 hours, cooled and filtered. The product is washed with nitrobenzene, freed of solvent by steam stripping, then slurried in hot ammonia solution, filtered, washed and dried. A yield of 227 parts, or 80% of theoretical, is obtained, of a blue-black powder which gives violet-brown dyeings.

If the copper and iodine are replaced by 41 parts of anhydrous cupric chloride, the yield of product is only about 57%.

The improvement in yield and purity of product obtained by the use of the iodine-containing cupriferous catalyst of the present invention will vary to some extent with different dyestuffs. However, in the case of each of the types of anthrimides described in the examples, marked improvement in yield and purity can be noted. The following table summarizes the examples where the improvements in yield are set forth numerically:

|  | Example | Cu-I Per Cent Yield | CuCl₂ Per Cent Yield |
|---|---|---|---|
| Dianthrimide | 8 | 75 | 20 |
| Trianthrimide | 1 | 82-90 | 50 |
| Do | 10 | 80 | 57 |
| Do | 9 | 98-102 | 57 |

We claim:
1. As a new and improved method of producing alpha, beta anthrimides by the Ullmann reaction from alpha halogen anthraquinone and beta-aminoanthraquinone compounds having the following formulae:

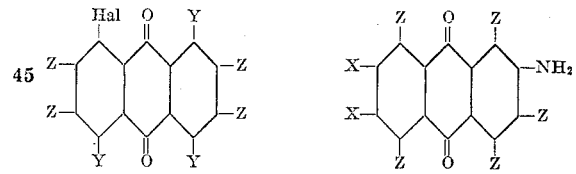

in which Hal represents a halogen, Z represents a monovalent inert substituent selected from the class consisting of hydrogen and a substituent group unreactive under Ullmann conditions, one Y is selected from the group consisting of Hal and Z, and the other Y's are Z, and one X is Z and the other X is selected from the group consisting of NH₂ and Z; the improved method which comprises reacting said beta - aminoanthraquinone compounds with said alpha-halogenanthraquinone in an organic solvent in the presence of an acid binding agent sufficient to react with the hydrogen halide set free and in the presence of a cupriferous catalyst containing copper and iodine in the ratio of from 0.9 to 2.0 atoms of iodine per atom of copper.

2. A method according to claim 1 in which the catalyst contains from 1.1 to 1.8 atoms of iodine per atom of copper.

3. A method according to claim 2 in which the unreactive groups are alpha-aroylamino and at least one Z on the alpha-halogen anthraquinone is aroylamino.

4. A method according to claim 3 in which the aroylamino group is benzoylamino.

5. A method according to claim 4 in which the reaction takes place in nitrobenzene as a reaction medium.

6. A method according to claim 1 in which the reaction takes place in nitrobenzene as a reaction medium.

7. A method according to claim 1 in which the beta-aminoanthraquinone is 2,6-diaminoanthraquinone.

8. A method according to claim 7 in which the halogen anthraquinone is alpha-chloroanthraquinone.

9. A method according to claim 7 in which the reaction takes place in nitrobenzene as a reaction medium.

10. A method according to claim 1 in which the beta-aminoanthraquinone is 2,6-diaminoanthraquinone and the alpha-halogen anthraquinone is alpha-chloroanthraquinone and the acid binding agent is sodium carbonate.

11. A method of producing an anthrimide which comprises reacting 2,6-diamino anthraquinone with alpha halogen alpha benzoyl-amino anthraquinones having no other substituents in an organic solvent in the presence of an acid binding agent sufficient to react with the hydrogen halide set free and in the presence of a cupriferous catalyst containing copper and iodine, the amount of iodine being more than 1 but less than 2 atoms per atom of copper.

12. A method of producing an anthrimide which comprises reacting 2,6-diamino anthraquinone with an alpha halogen alpha benzoyl-amino anthraquinone having no other substituents in nitrobenzene in the presence of an acid binding agent sufficient to react with the hydrogen halide set free and in the presence of a cupriferous catalyst containing copper and iodine, the amount of iodine being more than 1 but less than 2 atoms per atom of copper.

13. In the process of reacting 2,6-diamino anthraquinone with 1-chloro alpha benzoyl-amino anthraquinones having no other substituents in nitrobenzene in the presence of sodium carbonate, the improvement which consists in carrying out the reaction in the presence of finely divided copper and of an amount of iodine corresponding to 1.25 molecular equivalents of the copper used.

MARIO SCALERA.
HUGH W. STEWART.

REFERENCES CITED

The following references are of record in the file of this patent:

UNITED STATES PATENTS

| Number | Name | Date |
|---|---|---|
| 961,612 | Isler | June 14, 1910 |
| 1,974,866 | Hauser et al. | Sept. 25, 1934 |
| 2,174,751 | Koeberle et al. | Oct. 3, 1939 |

FOREIGN PATENTS

| Number | Country | Date |
|---|---|---|
| 9,219 | Great Britain | Jan. 27, 1910 |
| 25,986 | Great Britain | Aug. 4, 1910 |
| 29,138 | Great Britain | Dec. 13, 1910 |

OTHER REFERENCES

In re Wuertz et al., 27 C. C. P. A. 1039, 1940, C. D. 377, 519 O. G. 7.